Nov. 1, 1966  D. O. ATKINSON ETAL  3,283,123
PIPELINE HEATING SYSTEM AND METHOD FOR INSTALLING SAME
Filed March 18, 1964
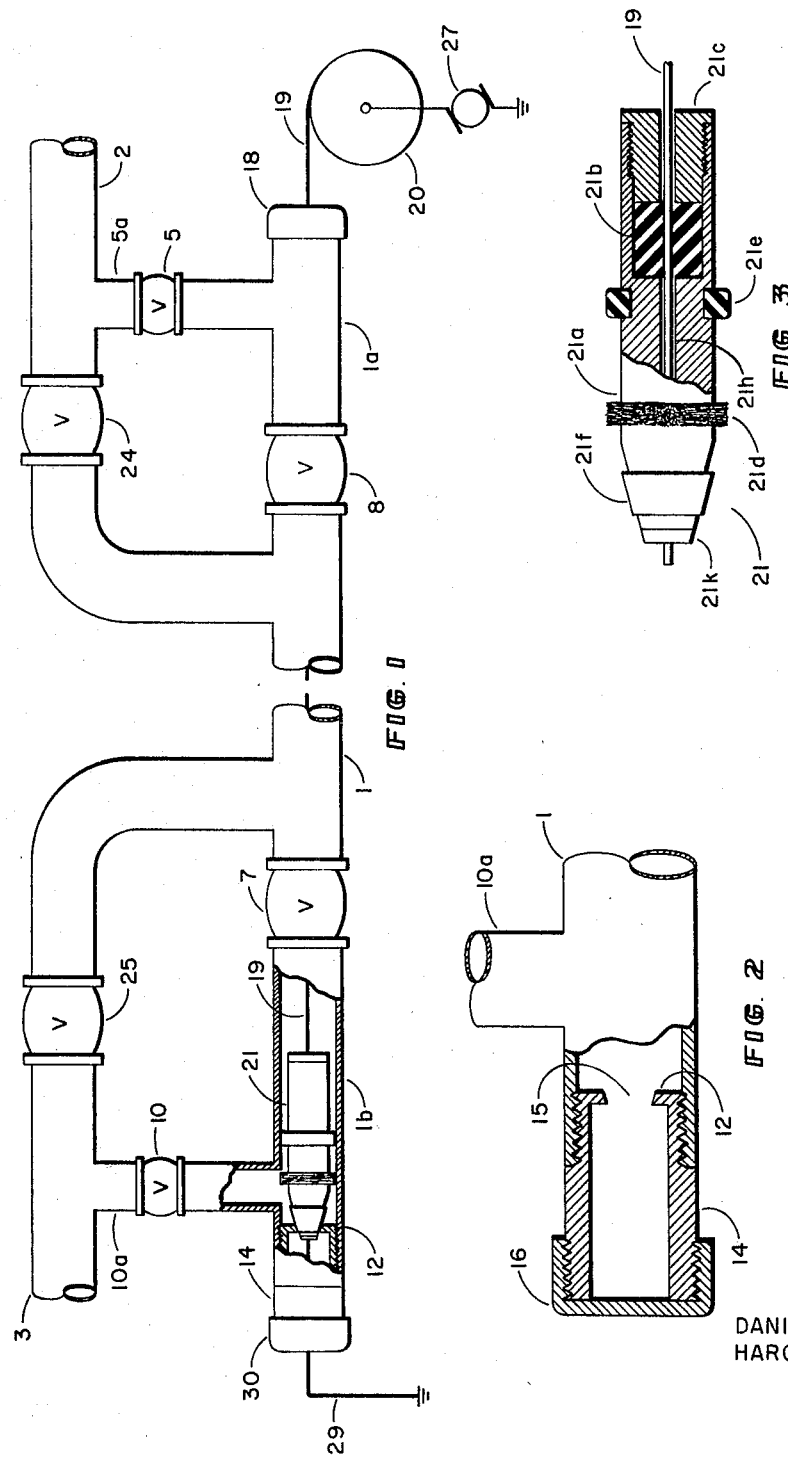
INVENTORS
DANIEL O. ATKINSON
HAROLD E. SCWARTZ, JR.

United States Patent Office 3,283,123
Patented Nov. 1, 1966

3,283,123
PIPELINE HEATING SYSTEM AND METHOD FOR INSTALLING SAME
Daniel O. Atkinson and Harold E. Schwartz, Jr., Wichita, Kans., assignors to Mobil Oil Corporation, a corporation of New York
Filed Mar. 18, 1964, Ser. No. 352,873
6 Claims. (Cl. 219—307)

This invention involves the transportation of fluids and more particularly the transportation of relatively viscous liquids through pipelines.

It often is desirable to heat fluids which are transported through fluid distribution systems. For example, in the petroleum industry highly viscous crude oils are heated, particularly during cold weather, in order to reduce their viscosity and thus facilitate their flow through pipelines. This often is accomplished by flowing the oil through heat exchangers prior to putting it in the pipe line and thereafter flowing the oil through additional heat exchangers located at intervals along the pipeline. While this practice has met with some success, it has serious disadvantages. For example, the temperature of the oil may vary widely between the heating stations because of the heat lost through the walls of the pipe. This greatly reduces the efficiency of the system and may even require that a greater pipeline capacity be used at locations distant from the heating stations where the temperature of the oil is relatively low. The pipe line may be insulated in order to reduce the heat loss from the oil. However, this is expensive and, in addition, considerable heat loss still takes place.

In order to overcome the disadvantages present in the above-described heating systems, the oil may be heated by a heating element placed internally of the pipeline. In this case, all of the heat generated passes directly into the oil and the heat loss to the exterior surroundings of the pipe is reduced. In addition, the oil can be heated throughout the length of a long line rather than at widely separated heating stations, thus reducing greatly the temperature variations along the line. Despite their relatively high efficiency, internal pipeline heaters have a serious drawback in that no satisfactory method has heretofore been developed for installing such a heater without first shutting down the pipeline system. In addition, these heaters must be temporarily removed in order not to obstruct the movement of scrapers which periodically are run through the line in order to clean it. The repeated shutting down of the pipeline attendant to installing and withdrawing the heater is of course quite expensive.

It is an object of this invention to provide an internally located heating system for a pipeline which may be installed and withdrawn while the line is in use.

It is a further object of the instant invention to provide a method of installing a heating element for such a system.

It is another object of the invention to provide a method of simultaneously cleaning the inner wall of a fluid conduit and installing a heating element in the conduit.

In carrying out the instant invention, a go-devil to which an elongated electrical heating element is connected is inserted into a fluid conduit through an opening therein. The opening is closed with a fluid-tight seal which is adapted to allow for slidable movement of the heating element. Fluid is passed through the conduit from a point upstream of the go-devil in order to move it downstream through the conduit. After the go-devil has been displaced to a predetermined position in the conduit, movement thereof is terminated and a fluid-tight seal between the go-devil and the conduit is established while fluid flow is continued through the conduit and into a flow line intersecting the conduit at a point upstream of the go-devil. The heating element then is connected in an electrical heating circuit.

For a better understanding of the instant invention, reference may be had to the following detailed description and accompanying drawings in which:

FIGURE 1 is a view partly in section of a pipeline system having an embodiment of the instant invention installed therein;

FIGURE 2 is a sectional view showing a portion of said system in detail; and

FIGURE 3 is a view partly in section of a pipeline scraper for use in the instant invention.

With reference to FIGURE 1, there is shown a pipeline system comprising a conduit 1 having end portions 1a and 1b, a first flow line 2 intersecting the conduit 1 at an upstream location, and a second flow line 3 intersecting the conduit at a downstream location. Oil is transported through the pipeline from an upstream shipping point (not shown) through line 2, conduit 1, and the line 3 to a downstream terminal point (not shown). Conduit 1 and lines 2 and 3 thus form the main flow line of the pipeline system and end portions 1a and 1b of the conduit form upstream and downstream traps, respectively, which accommodate the insertion and withdrawal of a pipeline go-devil.

The upstream and downstream traps are connected to the main flow line by means of inlet valves 5 and 7, respectively, and outlet valves 8 and 10, respectively. Valves 5 and 10 are located in conduits 5a and 10a, respectively. The downstream trap is provided with a removable stop 12 for a hereinafter-described go-devil. As is best shown in FIGURE 2, stop 12 comprises an annular shoulder which is formed integrally with a coupling 14 and which defines an opening 15. Coupling 14 is threadedly secured to the end of conduit 1 and is closed at its outer end by means of a removable cap 16. The upstream trap is closed by means of a stuffing box 18 (FIGURE 1) which is adapted to receive an elongated electrical heating element 19 in a slidable, fluid-tight relationship. Stuffing box 18 may be of the conventional wireline type and is threadedly secured to the upstream end of conduit 1.

Heating element 19 may be of any type having a relatively small diameter so as to present as little obstruction as possible to fluid flow through conduit 1. Preferably, the heating element is in the form of a flexible resistance wire or ribbon so that it may be mounted on a drum 20 in order to facilitate handling and storage. The resistance element is provided with insulation so as to prevent any electrical contact with the inner wall of the pipe.

In accordance with the instant invention, the heating element is installed by means of a go-devil. This may be any element which is movable through conduit 1 by fluid flow and which coacts with the conduit, e.g., by seating against stop means 12, to form a fluid-tight seal in the downstream trap. However, in the preferred embodiment of the invention, the go-devil will take the form of a pipeline scraper so that the line will be cleaned simultaneously with the installation of the heating element. Also, the heating element should be connected to the go-devil at a position thereon accessible from the downstream side of the seal formed between the go-devil and the conduit. This will enable the operator to open the downstream end of trap 1b and make the necessary electrical connections between the downstream terminal of the heating element and the exterior of the conduit and also to disconnect the heating element from the go-devil prior to withdrawing it from the conduit.

A suitable scraper 21 which conforms to these standards is shown in detail in FIGURE 3. The scraper comprises a body member 21a, a rubber packing 21b, a packing gland 21c, and annular cleaning elements 21d and 21e. Element 21d is a wire brush which acts to scrape wax and sediment from the pipe wall and element 21e is a rubber cup which scrapes the pipe wall and upon which the fluid acts to force the scraper through the line. The front end of the body member is provided with a rubber shoe 21f in order to insure that a good seal is established when the scraper seats on stop 12.

Heating element 19 is inserted through a passage 21h in the scraper and connected to the front end thereof by means of a clamp 21k or other suitable fastening means. Gland 21c is then screwed inwardly to the position shown in order to compress the packing 21b so that it forms a fluid-tight seal around heating element 19.

The heating element is installed as follows. After first insuring that valves 5 and 8 are closed, go-devil 21 with the heating element attached is inserted in the upstream trap to a position intermediate of valves 5 and 8 and the trap is closed by means of stuffing box 13. The heating element 19 extends through the stuffing box and is wound on reel or drum 20. Thereafter, valves 5 and 8 are opened and a valve 24 in the main flow line is completely or partially closed to divert at least a portion of the oil from the line into the upstream trap. This will displace the go-devil through valve 8 and into the main line. After the scraper has moved downstream of the intersection of conduit 2 and line 1, valve 24 may be opened to its normal position and valve 5 may be closed. Valve 8, of course, must remain open because of heating element 19.

Prior to the arrival of the go-devil at the downstream trap 1b, valves 7 and 10 are opened and a valve 25 in line 3 is completely or partially closed in order to insure that sufficient pressure is maintained behind the go-devil to force it against shoulder 12. After the go-devil reaches this position, valves 10 and 25 are closed and opened, respectively, and normal flow through the line is resumed. Valve 7 remains open in order to accommodate heating element 19.

After the go-devil is seated against stop means 12, element 19 is connected in an electrical heating circuit which includes an A.C. or D.C. generator 27 or other suitable power source. This is accomplished by removing cap 16 and establishing an electrical connection 29 from the downstream terminal of element 19, which is aligned with opening 15 and readily accessible from the exterior of the trap, to a suitable ground. Preferably, connection 29 and generator 27 are grounded on conduit 1 in order to complete the circuit. After making the necessary connections, the end of trap 1b is closed by a stuffing box 30 in order to insure against any leakage of fluid which may flow past the go-devil.

Once the heating element is installed, current is supplied thereto as necessary to heat the oil in the pipeline to the desired temperature. For this purpose, the heating circuit may include automatic controls which regulate the current to the heating element in response to factors such as the temperature of the oil in the pipeline. Since such controls are well known to those skilled in the art and form no part of the instant invention, they will not be described further.

The heating element 19 may be removed from conduit 1 without shutting down the pipeline system or otherwise interfering with flow therethrough. This is accomplished by releasing the heating element from the go-devil by unfastening clamp 21k and retrieving it on drum 20. Thereafter, valve 7 is closed and coupling 14 is disconnected from the end of trap 1b. The scrapper can then be removed from the trap.

Having described specific embodiments of the invention, it is understood that various modifications may be suggested to those skilled in the art, and it is intended to cover all such modifications as fall within the scope of the appended claims.

We claim:

1. In a fluid distribution and heating system, a conduit for carrying fluids having an upstream end portion and a downstream end portion, a stuffing-box closure in the upstream end portion of said conduit, a first flow line interconnecting with said conduit adjacent said upstream end portion and a second flow line interconnecting with said conduit adjacent said downstream end portion, stop means located in said conduit at a position downstream of the interconnection of said second flow line and said conduit, a go-devil slidably positioned in said conduit in abutting relationship with the upstream side of said stop means, means forming a fluid-tight seal between said go-devil and said conduit, an elongated heating element slidably extending through said stuffing-box closure in a fluid-tight relationship therewith and connected to said go-devil at a position accessible from a point downstream of said fluid-tight seal, and an open valve in said conduit intermediate said go-devil and the interconneciton of said second flow line and said conduit.

2. The system of claim 1 wherein said heating element comprises an electrical resistance element and further comprising an electrical heating circuit including a source of electric power and means connecting said resistance element in said heating circuit.

3. The system of claim 2 further comprising a second stuffing-box closure in said conduit downstream of said fluid-tight seal and wherein said connecting means includes an electrical connection extending through said second stuffing-box closure in a fluid-tight relationship therewith.

4. A method of placing an elongated electrical heating element in a conduit comprising the steps of connecting one end of said heating element to a go-devil, inserting said go-devil into said conduit through an opening therein whereby said heating element extends from the interior of said conduit to the exterior thereof through said opening, closed said opening with a fluid-tight seal adapted to allow slidable movement of said heating element therethrough, flowing fluid through said conduit from a point upstream of said go-devil whereby said go-devil is moved through said conduit in a downstream direction, terminating the downstream movement of said go-devil at a location within said conduit, connecting said heating element in an electrical heating circuit, and continuing to flow fluid through said conduit and into a flow line interconnecting with said conduit at a point intermediate said opening and said go-devil.

5. A method of placing an elongated electrical heating element in a conduit comprising the steps of connecting one end of said heating element to a go-devil and providing a terminal for said heating element at the forward end of said go-devil, inserting said go-devil into said conduit through an opening therein whereby said heating element extends through said opening from the interior of said conduit to the exterior thereof, closing said opening with a fluid-tight seal through which said heating element is slidable, flowing fluid through said conduit from a point upstream of said go-devil to move said go-devil in a downstream direction, terminating said downstream movement of said go-devil at a location within said conduit and establishing a fluid-tight seal between said go-devil and said conduit while continuing to flow fluid through said conduit and into a flow line interconnecting with said conduit at a point intermediate said go-devil and said opening, and establishing an electrical connection for said heating element extending from said terminal to the exterior of said conduit.

6. In a fluid distribution system having a main flow line in which fluid is flowing and an upstream trap and a downstream trap each of which is connected to said flow line by means of a normally closed inlet valve and a normally closed outlet valve, the method of placing an elongated electrical heating element in said flow line comprising the steps of connecting one end of said heating element to the forward end of a scraper for said flow line, inserting said scraper into said upstream trap through an opening therein whereby said heating element extends through said opening from the interior of said trap to the exterior thereof, closing said opening with a fluid-tight seal through which said heating element is slidable, thereafter opening the inlet and outlet valves of said upstream trap and diverting at least a portion of fluid from said main flow line into said upstream trap whereby said scraper is moved through said flow line in the direction of said downstream trap, opening said downstream inlet and outlet valves prior to the arrival of said scraper at said downstream trap, terminating the movement of said scraper when it reaches a position in said downstream trap and establishing a fluid-tight seal at said position between said scraper and said conduit, and establishing an electrical connection extending from said one end of said heating element to the exterior of said trap.

References Cited by the Examiner

UNITED STATES PATENTS

| | | | |
|---|---|---|---|
| 1,119,840 | 12/1914 | Kuhn | 219—306 X |
| 1,851,435 | 3/1932 | Jessup | 254—134.4 |
| 3,137,924 | 6/1964 | Wilkins | 338—226 X |
| 3,179,375 | 4/1965 | Hamrick | 254—134.4 |

RICHARD M. WOOD, *Primary Examiner.*

C. L. ALBRITTON, *Assistant Examiner.*